Oct. 30, 1962 G. B. MATTER 3,061,206
INSULATION SHREDDER AND BLOWER
Filed July 18, 1960 2 Sheets-Sheet 1

INVENTOR.
GEORGE B. MATTER
BY John M. Crawford
ATTORNEYS

INVENTOR.
GEORGE B. MATTER
BY John M. Crawford
ATTORNEYS

United States Patent Office 3,061,206
Patented Oct. 30, 1962

3,061,206
INSULATION SHREDDER AND BLOWER
George B. Matter, Longview, Wash., assignor to Weyerhaeuser Company, Tacoma, Wash., a corporation of Washington
Filed July 18, 1960, Ser. No. 43,552
1 Claim. (Cl. 241—60)

This invention relates to a machine for shredding and conveying a shreddable material, and specifically relates to a portable machine for shredding and pneumatically conveying an insulating material that has a high shredded material to baled material volume ratio.

Many insulating materials are installed in a loose or shredded form in order to create a large volume of dead air space. These materials are usually in baled or slightly compressed form prior to installation for convenience in handling. The shredded material to baled material volume ratio for most of these materials is usually in the order of 2:1 or less. Volume ratios in this range create few problems in the shredding and conveying process, since the volume of material entering the shredder and blower machine is about the same as the volume of material leaving the machine.

However, the typical shredder and blower machine will not work with insulation materials having a high shredded material to baled material volume ratio. Such ratios may be in the order of 6:1. This volume ratio is typical of those encountered in insulating material manufactured from wood fiber components. These higher volume ratios require a machine having a shredder capable of shredding the material into fine particles, and a conveyor, or blower, system capable of moving large volumes of material whereby the shredded material will be removed rapidly from the shredder outlet port, and will remain in fluid suspension while in the conveying system. Thus the user will be assured that the machine will not clog during use.

It is an object of this invention to provide a machine for shredding and conveying a shreddable material that is capable of handling a material having a high volume ratio of shredded to unshredded material.

It is a further object of this invention to provide a machine for shredding and conveying a shreddable material that will rapidly convey the shredded material away from the shredder.

It is a further object of this invention to provide a shredder that is capable of handling a material having a high volume ratio of shredded material to unshredded material.

Figure 1:
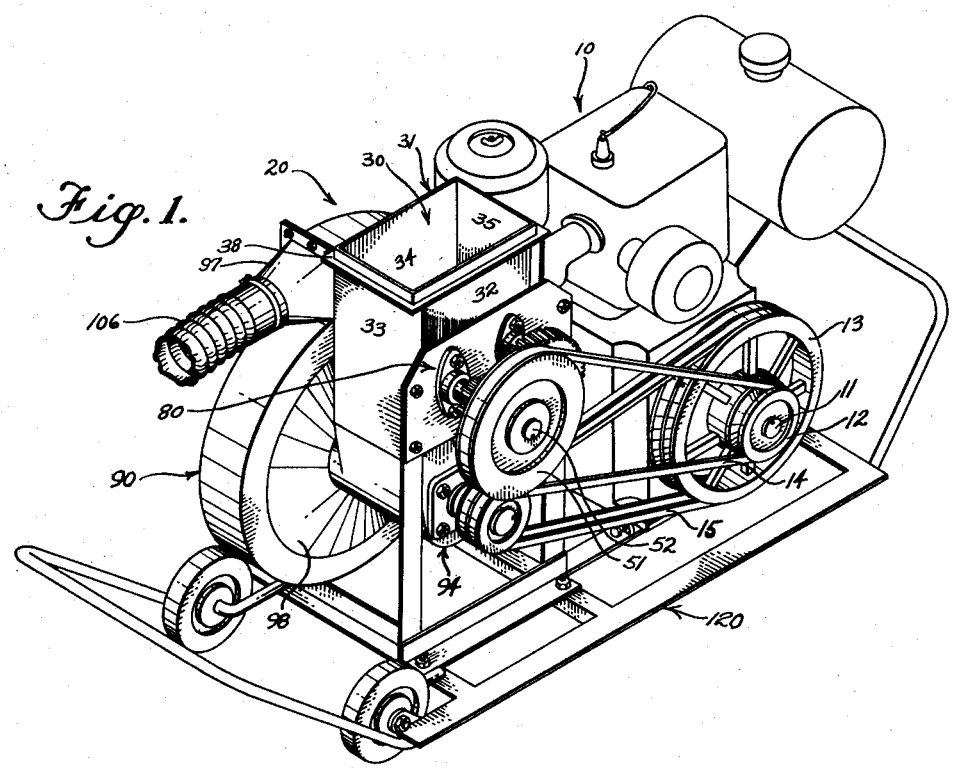
Figure 2:
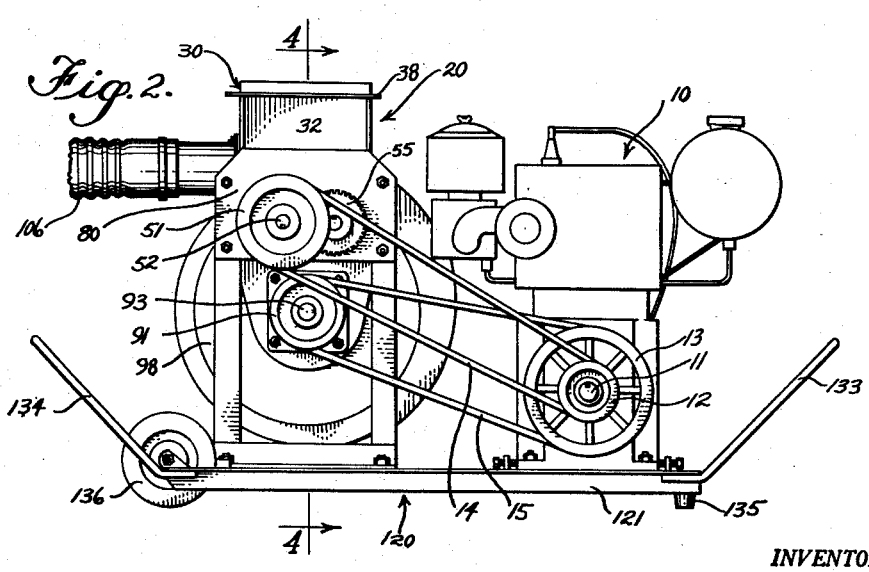
Figure 3:
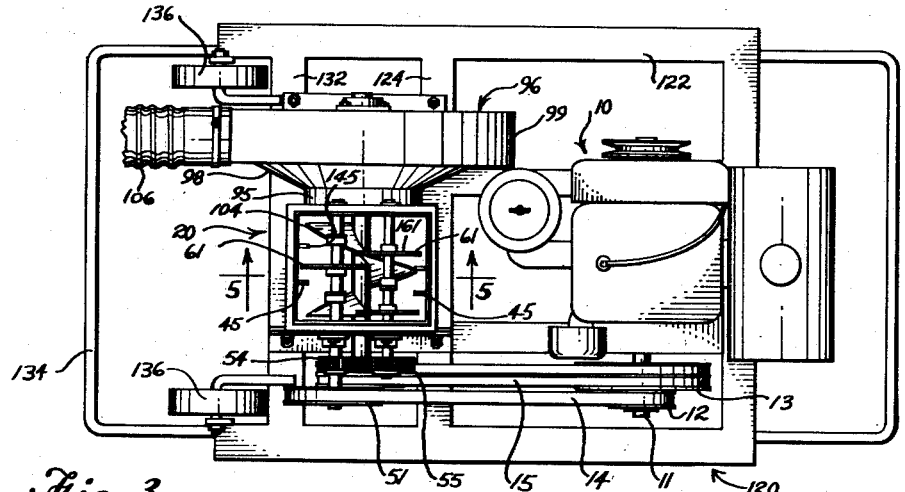
Figures 4, 5:
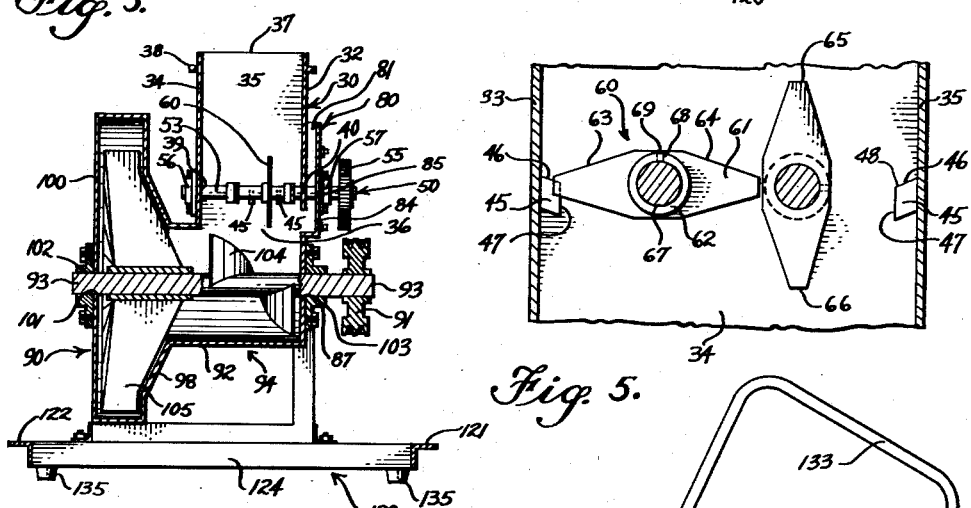
Figure 6:
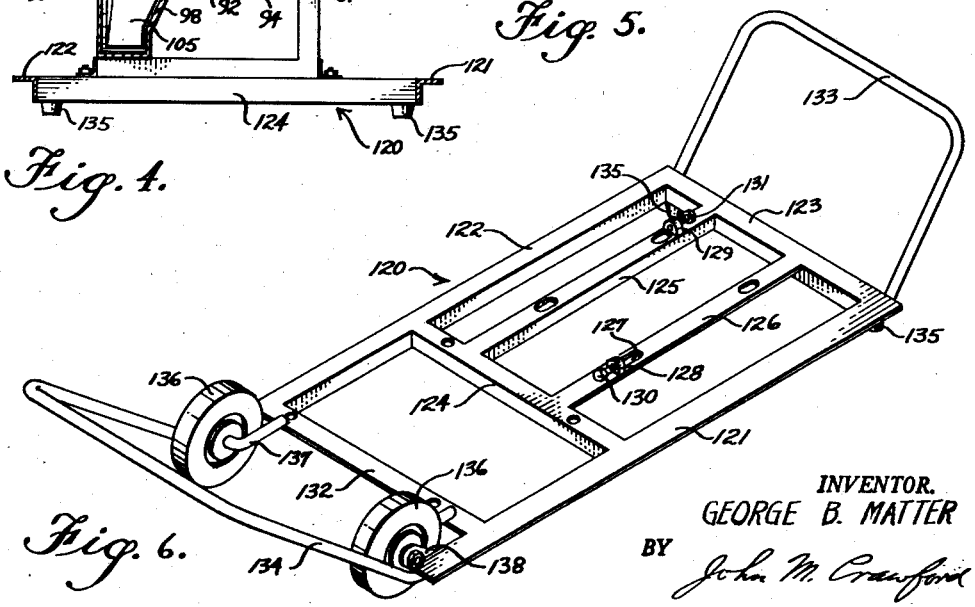

Other objects and advantages of the invention will become apparent upon reference to the following description and the accompanying drawings, in which:

FIGURE 1 is a perspective view of the machine embodying the invention;
FIGURE 2 is a side elevational view of the machine showing the drive belt arrangement;
FIGURE 3 is a top plan view of the apparatus;
FIGURE 4 is a view, partly in section, taken along line 4—4 of FIGURE 2;
FIGURE 5 is a cross-sectional view taken along lines 5—5 of FIGURE 3;
FIGURE 6 is a perspective view of the transporting frame.

Generally the apparatus comprises a motor 10 driving a shredder and blower unit 20. Unit 20 has a shredder section 30, an air intake section 80, and a blower section 90. The apparatus is transported on a frame 120.

In operation, material enters and is shredded in shredder section 30. From the shredder section the material drops into blower section 90 where the material is mixed with air from air intake section 80, and conveyed to the desired location.

Specifically, motor 10 has a drive shaft 11 rotatably carrying drive pulleys 12 and 13. Drive pulley 12 is connected by belt 14 to shredder drive pulley 51, and drive pulley 13 is connected by belt 15 to blower drive pulley 91. Pulleys 51 and 91 are mounted on the shredder and blower unit 20 in a manner that will be described later.

Shredder and blower unit 20 has a shredder section 30, an air intake section 80, and a blower section 90.

Shredder section 30 consists of a hopper 31 and a shredder unit 50. Hopper 31 is integral with air intake section 80.

Hopper 31 is formed by longitudinal side walls 32 and 34, and transverse end walls 33 and 35. These walls define a shredder or hopper outlet 36 at their lower ends, and a hopper inlet 37 at their upper ends. Mounted on the outer faces of the hopper walls adjacent inlet 37 is a flange 38. The flange may support a hopper cover (not shown) or a hopper extension (not shown), and also serves as a deflector to prevent large pieces of baled material from entering air inlet 81.

Air inlet 81 is located adjacent hopper side wall 32, and between the hopper outlet 36 and hopper inlet 37. The air inlet is defined by hopper longitudinal wall 32, extensions of hopper end walls 33 and 35, respectively, and air intake longitudinal side wall 84. The four walls form an air chimney mounted on the hopper, with wall 32 acting as a separator or baffle plate between the hopper and the air chimney. This prevents material from shredder unit 50 from being ejected from the machine through air inlet 81.

Shredder unit 50, located in hopper 31, comprises a plurality of shredders 60 fixedly mounted on shredder drive shafts 52 and 53. The drive shafts are rotated by an external driving arrangement. This arrangement consists of drive pulley 51, fixedly mounted on shaft 52, and gear wheels 54 and 55, fixedly mounted on shafts 52 and 53. Shaft 52 is rotated by the motor 10 through drive pulley 51, and shaft 53 is rotated by shaft 52 through gears 54 and 55. The gears are usually of different diameters so that the shaft rotations will be different. The shafts are journaled in bearings 56, mounted outwardly and adjacent hopper wall 34, and bearing 57, mounted outwardly and adjacent air chimney wall 84, and kept from endwise movement by conventional locking means. Shafts 52 and 53 extend through openings in hopper walls 32 and 34, and air chimney wall 84. As shown in FIGURE 4, shaft 53 extends through opening 39 in wall 34, opening 40 in wall 32, and opening 85 in wall 84.

Fixedly mounted on shafts 52 and 53 are a plurality of shredders 60. Each shredder consists of a blade 61 and a collar 62, which are integrally joined. Blade 61 is tapered toward both ends as shown at 63 and 64. Blade ends 65 and 66 are substantially perpendicular to the longitudinal axis of the blade. Blade 61 and collar 62 have a bore 67 extending through them for engagement with shafts 52 and 53. Extending through the collar substantially perpendicularly to the axis of bore 67 is a threaded bore 68. The threaded bore 68 has a locking screw 69 extending through it for fixedly mounting the shredder on its shaft. In the version of the machine illustrated there are three shredders mounted on each shaft. In this version, each shredder on a shaft is mounted with its longitudinal axis substantially perpendicular to the longitudinal axis of the adjacent shredder on that shaft.

The shredders on each shaft interact with the shredders on the adjacent shaft and with holdout lugs 45 on the adjacent hopper wall. Lugs 45 are mounted on hopper walls 33 and 35 and are located at a position that is substantially midway between the blades of adjacent pairs of shredders. The lugs extend into the hopper a distance that permits them to overlap the shredder blades for approximately one ninth of the total length of a blade.

Each lug has an inwardly tapering top edge 46 which meets front edge 47 at a corner 48. In the illustrated version, corner 48 is in the same horizontal plane as the axis of rotation of shafts 52 and 53. The horizontal angle of taper of the holdout lug is less than the horizontal angle of taper of the shredder blade. The positioning of the lugs with respect to the blades, and the distance that the lugs extend toward the center of the hopper have a marked effect on the capacity of the machine in terms of pounds of material shredded per unit time.

The shredder blades support the baled material at the center of the hopper. As may be seen in FIG. 5, the blades on the adjacent shafts overlap each other for approximately one-half of the total length of the blade. In that figure, shaft 52 is rotating in a counterclockwise direction, and shaft 53 is rotating in a clockwise direction. It may then be seen that the center of the bale is being forced upwardly and outwardly at all times. Since the blades overlap each other, it is necessary to offset the blades on one shaft from the blades on the adjacent shaft. As may be seen in FIGURE 3, the preferred axial position of the blades is one in which one of the side faces of the blade, such as face 161 of blade 61 is in the same vertical plane as the oppositely directed face of a lug, such as face 145 of lug 45, mounted on the end wall of the hopper adjacent the other rotor.

After being shredded, material leaves the hopper through outlet 36 and enters blower section 90 where it is mixed with air from air intake section 80. Blower section 90 comprises a casing 92 housing blower drive shaft 93.

The casing 92 has an inlet section 94, a cylindrical intermediate section 95, a fan casing section 96, and an outlet 97. The inlet section is formed by extensions of hopper walls 33, 34 and 35, and air chimney wall 84. The extensions of walls 33 and 35 taper inwardly and are tangential to the lower side of cylindrical intermediate section 95. The lower portion of the inlet section 94 is coextensive with intermediate section 95. Section 95 is integrally joined with conical entrance portion 98 of fan casing 96. Outer wall 99 of fan casing 96 spirals outwardly to terminate in cylindrical outlet 97. Attached to the outlet is a hose 106. The fan section has an end wall 100. Wall 100 and wall 84, forming the two end walls of the blower section, have openings 101 and 87, respectively, through which shaft 93 extends.

Shaft 93 is rotatably journaled in bearings 102, adjacent wall 100, and 103, adjacent wall 84. The shaft is rotated by motor 10 acting on pulley 91 which is fixedly mounted on the shaft. The shaft carries a helical worm screw conveyor 104 in the inlet section and a conical fan 105 in the fan section. The worm conveys the heavier particles of material to the fan which projects the fluid stream carrying the shredded material to the site where the material is being applied.

The shredder and blower machine is mounted on a transport frame 120 so that it may be easily transported to its place of use. The transport frame consists of two longitudinal side members 121 and 122. The two longitudinal side members are tied together by three transverse members. Member 123 is located at one end of the side members; member 124 is located midway of the side members; and member 132 is located near the other ends of the two members. Extending between transverse members 123 and 124 are longitudinal members 125 and 126. These latter members are substantially parallel to the first longitudinal members. Located in longitudinal members 125 and 126 are slots 127 for the accommodation of suitable pins (not shown) in the motor section of the blower and conveyer machine. Members 125 and 126 also have lugs 128 and 129 integral with them. The lugs have threaded bores receiving threaded screws 130 and 131. These engage portions of the machine to lock the machine on the transport frame.

Extending upwardly and outwardly from both ends of the frame are handles 133 and 134. The position of the handles makes it easier to carry the machine. Additionally aiding the transportability of the machine is a pair of wheels 136. The wheels are mounted on a pair of stub axles 137 which are mounted on lugs 138, located on the other end of side members 121 and 122. The axles also rest on transverse member 132. The opposite ends of transport frame 120 rest on legs 135.

While specific details of a preferred embodiment have been set forth above, it will be apparent that many changes and modifications may be made therein without departing from the spirit of the invention. It will therefore be understood that what is described is intended to be illustrative only, and is not intended to limit the scope of the invention.

What is claimed is:

An apparatus for shredding and conveying a baled insulating material to baled material having a high shredded material to baled material volume ratio comprising a hopper having a plurality of walls, a shredder mounted in said hopper, said shredder comprising a pair of rotatable shafts mounted in a plane that is substantially normal to the vertical axis of said hopper, said shafts having a series of blade pairs mounted thereon, said blade pairs of one shaft being offset from said blade pairs of said other shaft, said blade pairs on each shaft being of a length to provide interengagement with said blade pairs on said other shaft, holdout lugs mounted on said hopper walls, said lugs being substantially parallel to said blade pairs and having interengagement with said blade pairs, the upper edge of said lugs being inclined downwardly toward the center of said hopper, a casing integrally attached to and mounted below said hopper for receiving material from said shredder, an air chimney mounted on and extending upwardly from said last mentioned casing adjacent said hopper, said casing having a rotatable shaft extending therethrough, a screw conveyer mounted on said last mentioned shaft below said hopper, a fan mounted on said last mentioned shaft at a point removed from said screw conveyer, said fan being within said casing, said fan and said air chimney being on opposite sides of said hopper, and an outlet on said casing in the vicinity of said fan.

References Cited in the file of this patent

UNITED STATES PATENTS

| 500,582 | Jones | July 4, 1893 |
| 1,434,508 | Shimon | Nov. 7, 1922 |
| 2,114,557 | Davis | Apr. 19, 1938 |
| 2,183,583 | Patterson | Dec. 19, 1939 |
| 2,291,871 | Bokum et al. | Aug. 4, 1942 |
| 2,494,705 | Hamilton | Jan. 17, 1950 |
| 2,500,031 | Hall | Mar. 7, 1950 |
| 2,532,351 | Wedebrock | Dec. 5, 1950 |
| 2,858,080 | Couchot | Oct. 28, 1958 |

FOREIGN PATENTS

| 191,786 | Switzerland | Sept. 16, 1937 |
| 654,914 | Great Britain | July 4, 1951 |
| 903,945 | France | Feb. 12, 1945 |
| 1,009,651 | France | Mar. 12, 1952 |